(12) United States Patent
Ponomarev et al.

(10) Patent No.: US 11,958,261 B2
(45) Date of Patent: Apr. 16, 2024

(54) SHOE MANUFACTURING

(71) Applicant: HEWLETT-PACKARD DEVELOPMENT COMPANY, L.P., Spring, TX (US)

(72) Inventors: Edward Ponomarev, San Diego, CA (US); Matthew G. Lopez, San Diego, CA (US); Stephen George Miller, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 698 days.

(21) Appl. No.: 17/054,450

(22) PCT Filed: Jul. 20, 2018

(86) PCT No.: PCT/US2018/043085
§ 371 (c)(1),
(2) Date: Nov. 10, 2020

(87) PCT Pub. No.: WO2018/097337
PCT Pub. Date: Jan. 23, 2020

(65) Prior Publication Data
US 2021/0229386 A1    Jul. 29, 2021

(51) Int. Cl.
*B29D 35/06* (2010.01)
*A43D 1/02* (2006.01)
*B29D 35/08* (2010.01)
*B33Y 80/00* (2015.01)

(52) U.S. Cl.
CPC .......... *B29D 35/062* (2013.01); *A43D 1/025* (2013.01); *B29D 35/081* (2013.01); *A43D 2200/00* (2013.01); *B33Y 80/00* (2014.12)

(58) Field of Classification Search
CPC ............ A43D 2200/00; A43D 2200/60; A43D 21/00; B29D 35/062; B29D 35/081; B33Y 80/00
See application file for complete search history.

(56) References Cited

U.S. PATENT DOCUMENTS

| | | | | |
|---|---|---|---|---|
| 3,601,908 | A  * | 8/1971 | Gilkerson | A43B 7/141 36/43 |
| 6,601,042 | B1 * | 7/2003 | Lyden | G06Q 30/0621 36/38 |
| 9,788,607 | B2 | 10/2017 | Waatti | |

(Continued)

FOREIGN PATENT DOCUMENTS

| | | |
|---|---|---|
| CN | 106378929 A | 2/2017 |
| EP | 2904920 A2 | 8/2015 |

(Continued)

*Primary Examiner* — Marie D Bays
(74) *Attorney, Agent, or Firm* — Michael Dryja

(57) ABSTRACT

Example shoe manufacturing methods and related computer readable medium for implementing a portion of said manufacturing methods are disclosed herein. In some examples, the method includes placing an upper member about an upper portion of a last, wherein the last is a form for the shoe. In addition, the method includes producing a lasting based on data relating to a foot of a user, and attaching the lasting to the upper member, wherein the lasting extends over a lower portion of the last. Further, the method includes molding a sole onto the lasting and the upper member, and removing the last from the upper member.

8 Claims, 8 Drawing Sheets

(56) References Cited

U.S. PATENT DOCUMENTS

| | | | |
|---|---|---|---|
| 9,877,539 B1* | 1/2018 | Jackrel | A43B 23/07 |
| 2003/0051372 A1* | 3/2003 | Lyden | G06Q 30/0621 |
| | | | 36/27 |
| 2003/0069807 A1* | 4/2003 | Lyden | A43B 7/1464 |
| | | | 705/26.5 |
| 2005/0060909 A1* | 3/2005 | Kerns | A43B 7/1435 |
| | | | 36/28 |
| 2007/0043630 A1* | 2/2007 | Lyden | A43B 7/22 |
| | | | 705/26.5 |
| 2009/0025260 A1 | 1/2009 | Nakano | |
| 2010/0050475 A1* | 3/2010 | Benz | A43C 15/16 |
| | | | 36/114 |
| 2010/0236098 A1* | 9/2010 | Morgan | A43B 7/144 |
| | | | 12/146 B |
| 2016/0044988 A1* | 2/2016 | Delgorgue | A43B 3/16 |
| | | | 36/131 |
| 2016/0051009 A1 | 2/2016 | Kormann et al. | |
| 2016/0107391 A1 | 4/2016 | Parish et al. | |
| 2016/0125499 A1 | 5/2016 | Gooch et al. | |
| 2016/0185062 A1* | 6/2016 | Boucher | A42B 3/06 |
| | | | 264/516 |
| 2016/0192741 A1 | 7/2016 | Mark | |
| 2016/0219973 A1* | 8/2016 | Cheney | A43B 13/38 |
| 2016/0302517 A1* | 10/2016 | Jessiman | A43B 13/187 |
| 2017/0245585 A1* | 8/2017 | Cook | A43B 3/126 |
| 2017/0318899 A1* | 11/2017 | Hendrix | A43B 7/08 |
| 2018/0132564 A1* | 5/2018 | Bruce | A43B 13/189 |
| 2018/0146748 A1* | 5/2018 | Cornett | A43D 25/047 |
| 2018/0153252 A1* | 6/2018 | Archer | A43B 9/18 |
| 2019/0000185 A1* | 1/2019 | Heidel | A43D 3/025 |
| 2019/0313734 A1* | 10/2019 | Bartel | A43B 13/04 |
| 2022/0369767 A1* | 11/2022 | Torres | A43B 21/24 |
| 2022/0408877 A1* | 12/2022 | Healy | A43B 7/144 |

FOREIGN PATENT DOCUMENTS

| | | |
|---|---|---|
| EP | 2430938 B1 | 6/2018 |
| RU | 2223020 C2 | 2/2004 |
| WO | WO-2018097337 A1 | 5/2018 |

* cited by examiner

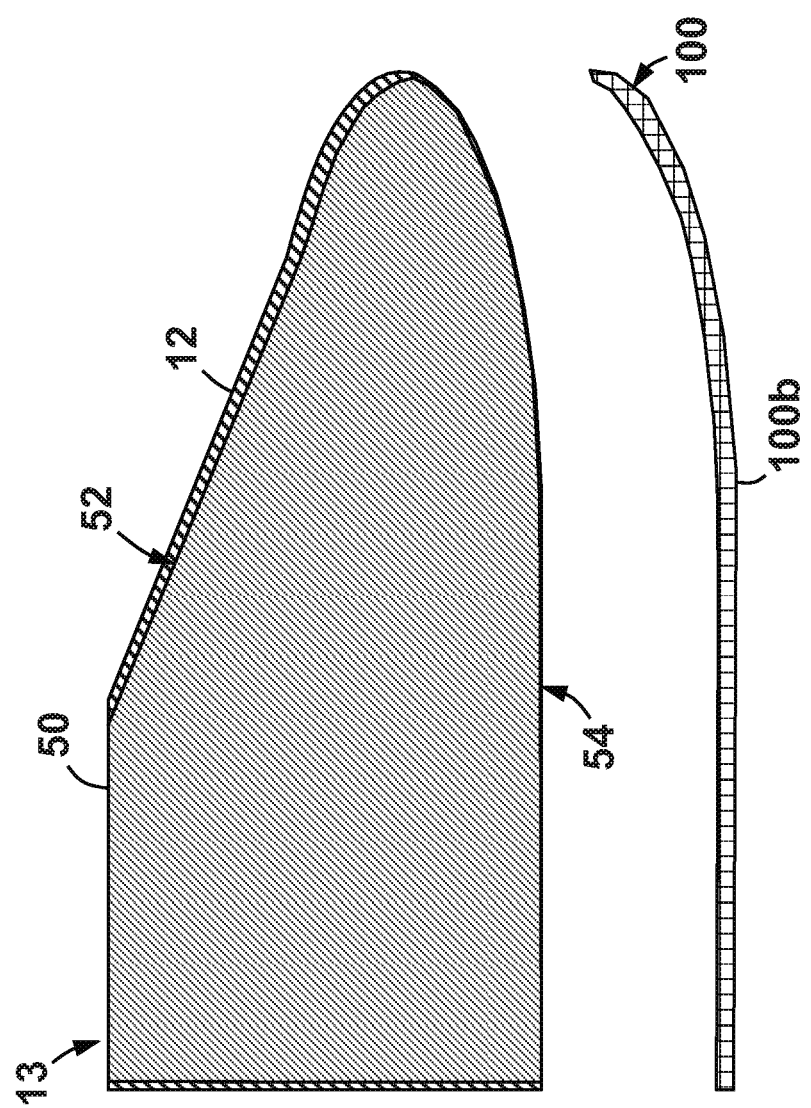

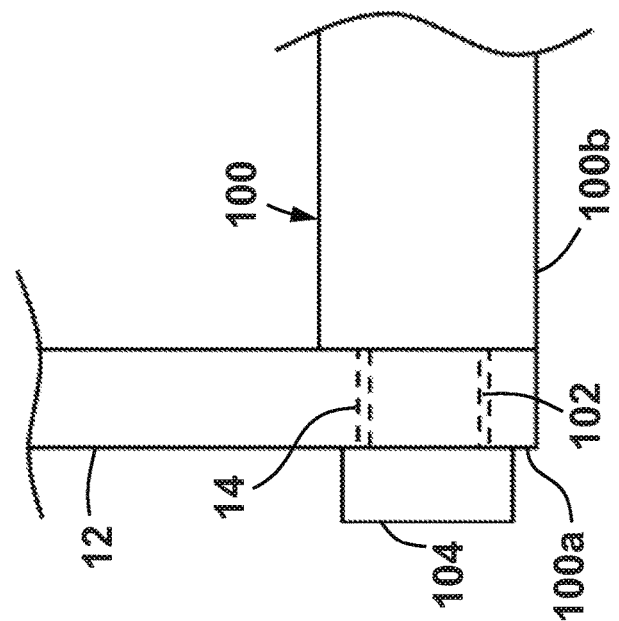
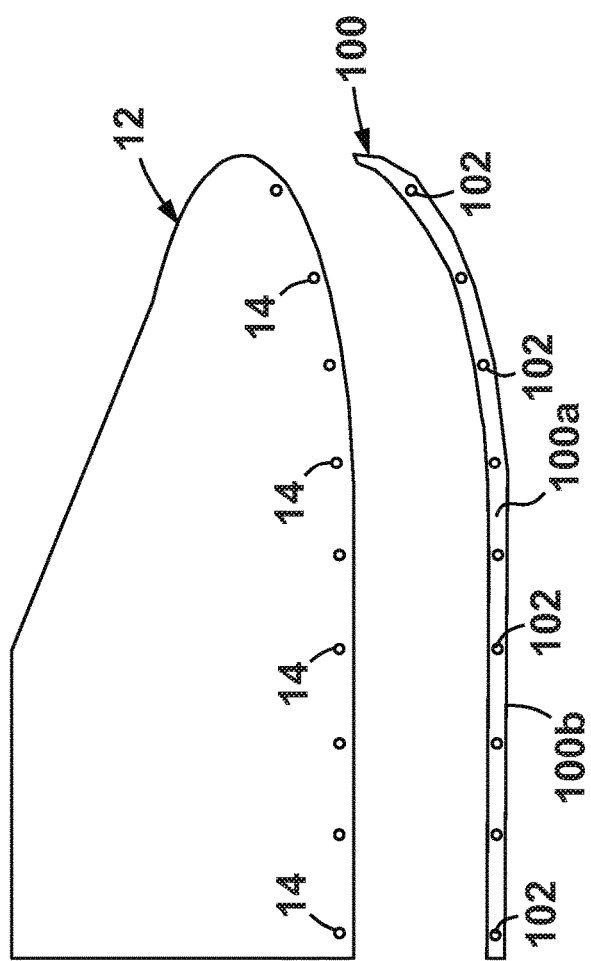

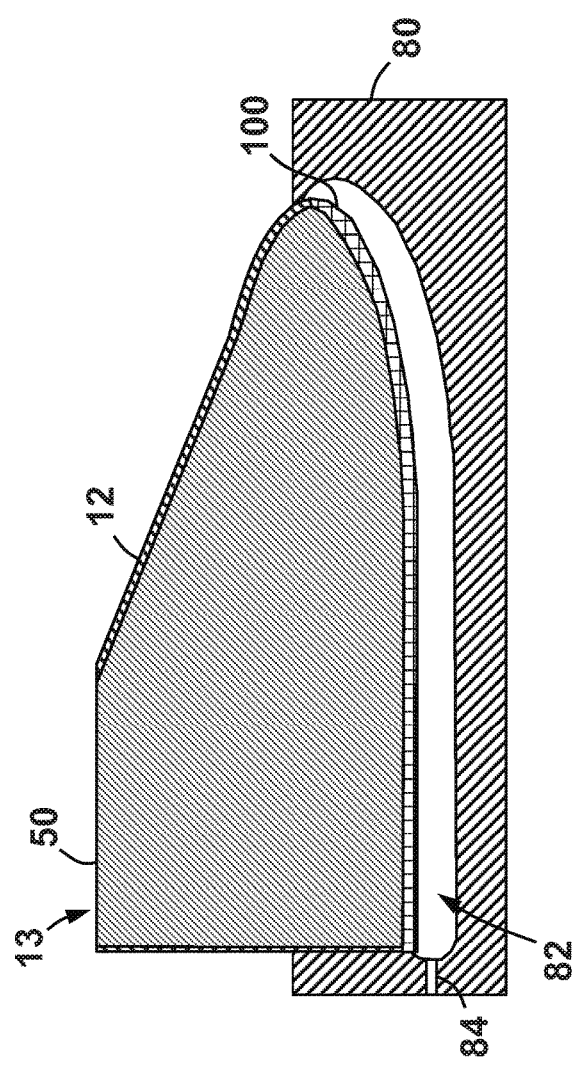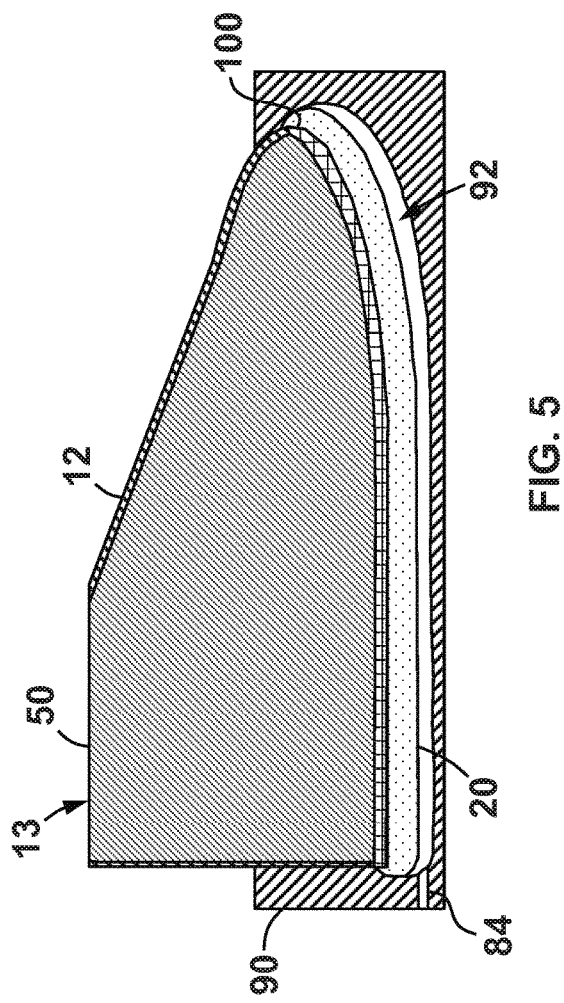

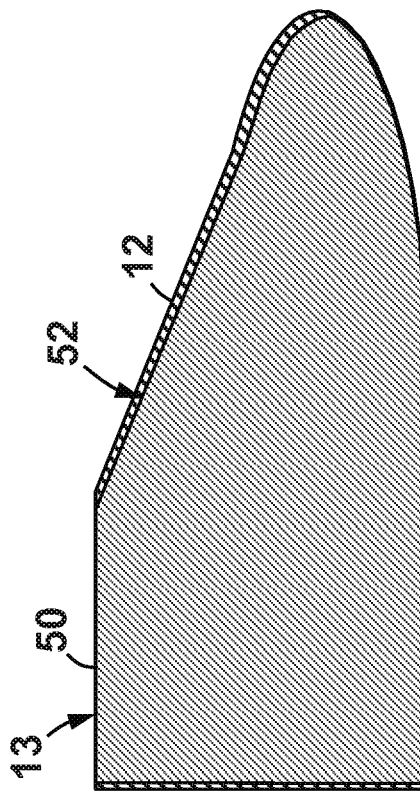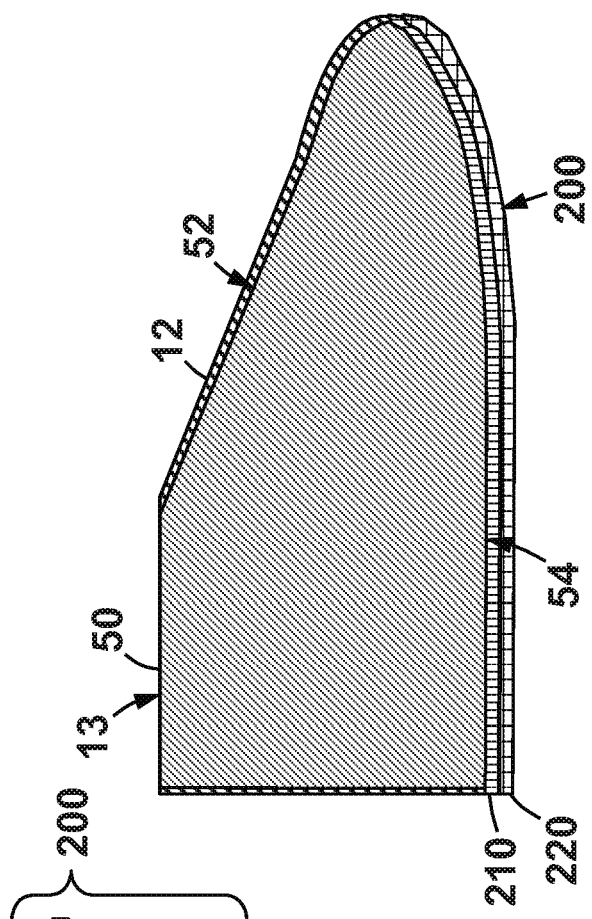
FIG. 6
FIG. 7

SHOE MANUFACTURING

BACKGROUND

Footwear of various types, including some boots, sandals, and athletic shoes, may be formed by a fabrication method that includes assembling various pre-manufactured components into a mold and injecting an elastomer, or another moldable material, into the mold to produce a portion of the sole. The moldable material bonds the other components together and provides additional structure to the sole. The end result is a completed piece of footwear.

BRIEF DESCRIPTION OF THE DRAWINGS

Various examples will be described below referring to the following figures:

FIG. 2 is a schematic, exploded cross-sectional view of an upper member and a lasting of the shoe of FIG. 1 about a last according to some examples;

FIG. 3A is a schematic, exploded view of the upper member and the lasting of FIG. 2 including a plurality of corresponding attachment projections and apertures according to some examples;

FIG. 3B is an enlarged view of one of the attachment projections and apertures of FIG. 3A according to some examples;

FIGS. 4 and 5 are schematic cross-sectional views of molding processes for forming a midsole and outsole, respectively, on the shoe of FIG. 1 according to some examples;

FIGS. 6 and 7 are sequential cross-sectional views of an upper member and a lasting disposed about a last for another shoe made according to some examples;

DETAILED DESCRIPTION

In the following discussion and in the claims, the terms "including" and "comprising" are used in an open-ended fashion, and thus should be interpreted to mean "including, but not limited to . . . " Also, the term "couple" or "couples" is intended to be broad enough to encompass both indirect and direct connections. Thus, if a first device couples to a second device, that connection may be through a direct connection or through an indirect connection via other devices, components, and connections.

As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 20% of the stated value or condition.

As used herein, "moldable" refers broadly to a capability of a material to flow into or to be injected into a mold or to be plastically deformed (which is a type of molding process in some examples) into a desired shape. Moldable further refers to such capability, as described above, for the material before, during, or after molding or deformation occurs. As examples, a suitable material supplied for a molding process is moldable, and the final product, such as a portion of the sole of a shoe, is moldable even after cooling or curing is completed. The term "moldable material" may refer to such a material at any stage of a process or any stage of the life of a product. As used herein, the term "user" refers to a person that is to wear a piece of footwear (e.g., a shoe).

As previously described, footwear may be manufactured by molding a sole (or a portion thereof, such as, a midsole or outsole portion) to other pre-manufactured or preassembled components. By utilizing this sort of manufacturing method, it can be difficult to incorporate individualized or customized components to provide performance characteristics that are tailored to a specific individual's foot (e.g., flexure, hardness, rebound, lateral and medial support characteristics, comfort, etc.). In many cases, providing a shoe that delivers such individualized performance characteristics is particularly desirable, such as for athletes or individuals requiring specialized support due to, for example, an injury or disorder. Accordingly, examples disclosed herein include manufacturing methods for producing footwear that incorporates such individualized components and features and machine readable instructions for carrying out portions of these manufacturing processes.

Figure 1:
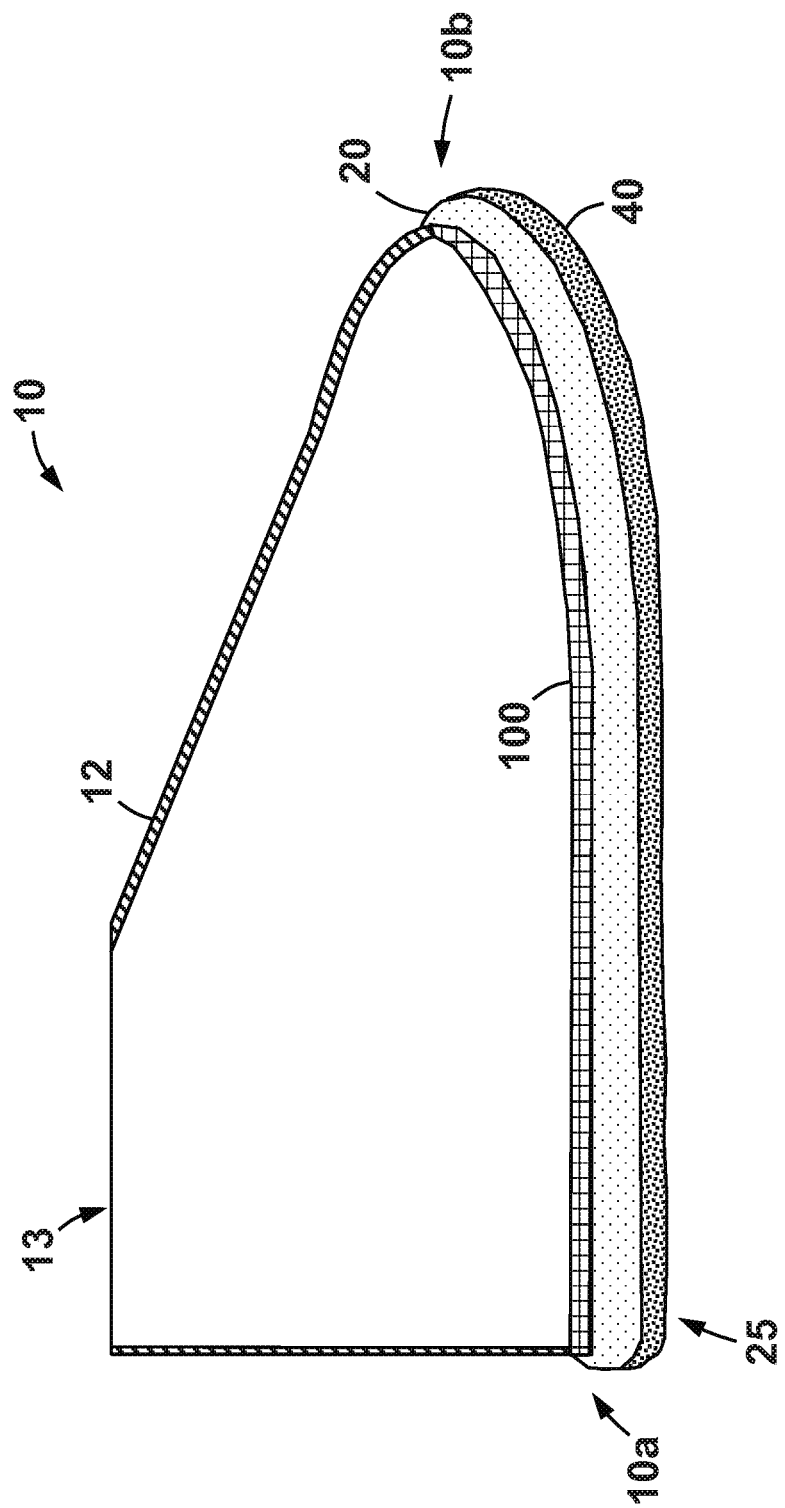
FIG. 1 is a schematic cross-sectional view of a shoe made according to some examples.

Referring now to FIG. 1, footwear 10 that is manufactured according to examples disclosed herein is shown. In this example, and in the other examples expressly described herein, footwear 10 comprises a shoe, and thus, footwear 10 may be generally referred to herein as a shoe 10. However, it should be appreciated that footwear 10 may also comprise a boot, sandal, or any other suitable form of footwear.

Shoe 10 includes a first or heel end 10a, a second or toe end 10b opposite heel end 10a, and an upper opening 13 to provide access for a user's foot (not shown) into shoe 10. When the foot of a user (not shown) is received through opening 13 and into shoe 10, the heel of the user's foot is proximate heel end 10a, and the toes of the user's foot are proximate toe end 10b. In addition, shoe 10 includes an upper member 12, a customized lasting 100 attached to upper member 12, a midsole 20 mounted to the lasting 100 and the upper member 12, and an outsole 40 mounted to the midsole 20. Together, the midsole 20 and outsole 40 may be referred to as the sole 25 of shoe 10.

As will be described in more detail below, lasting 100 is a customized portion of the shoe 10 that is designed based on data relating to the foot of a specific user so as to provide desired performance characteristics specific to the user's foot (e.g., flexure, hardness, rebound, lateral and medial support characteristics, comfort, etc.). The method for manufacturing shoe 10 will now be described in more detail below.

Referring generally now to FIGS. 2-4, an example process or method for manufacturing shoe 10 is shown. Generally speaking, the method of FIGS. 2-4 includes placing upper member 12 and lasting 100 about a last 50 (which is the mechanical form for the shoe that generally resembles a wearer's foot) (see FIG. 2). Thereafter, the midsole 20 and outsole 40 of the shoe 10 are formed about the upper member 12 and lasting 100 to complete the shoe. These processes will now be discussed in more detail below.

Referring first to FIG. 2, initially, the upper member 12 is disposed about last 50. In particular, upon completion of the shoe 10, upper member 12 forms the upper portion or region of the shoe 10 (see FIG. 1). Thus, upper member 12 may comprise fabrics, textiles, or other suitable materials depending on the design of shoe 10. The last 50 comprises an upper portion 52 that corresponds with an upper portion of a wearer's foot, and a lower portion 54 that corresponds with the bottom of a wearer's foot. In this example, upper member 12 is only disposed about the upper portion 52 of last 50 such that the lower portion 54 is not covered by upper member 12 and is exposed. Accordingly, the lasting 100 is attached to the upper member 12 such that the lasting 100 extends over and covers lower portion 54. Therefore, together, upper member 12 and lasting 100 surround the entirety of last 50 except for opening 13 along upper portion 52 that eventually forms the opening into shoe 10 as previously described.

Lasting 100 is manufactured to provide desired highly-tuned flexure, hardness, resilience, comfort, and other characteristics that may be customized for either a market segment, or for a particular customer. Accordingly, lasting 100 may be manufactured according to data relating to the foot of an individual user (or an idealized foot of an assumed user). For example, lasting 100 may be manufactured based on one or both of three dimensional (3D) scans of the individuals foot and pressure readings associated with the foot. Specifically, 3D scans may include measurements of the foot obtained using a 3D foot scanner. Such scans may produce 3D scan data that may then be used (either alone or along with the pressure readings as described below) to create a 3D digital representation of the foot. In addition, the pressure readings (which also may be referred to herein as "pressure data") may indicate the pressure distribution experienced by the foot. The pressure readings may include both static pressure readings (e.g., when the individual is standing still) and dynamic pressure readings (e.g., when the individual is in motion), and may be used to analyze the biomechanical characteristics of the user's foot and gait such that this analysis may be included with or incorporated in the 3D digital representation of the foot. The pressure readings (e.g., static, dynamic, both) may be obtained using a pressure sensor.

Upon creating the digital representation of the individual's foot (e.g., based on the 3D scan data and pressure readings), the digital representation may then be used to design and manufacture lasting 100 to provide the desired performance characteristics for the individual. Any suitable manufacturing technique may be used to manufacture lasting. For example, in some implementations additive manufacturing techniques may be used to manufacture lasting 100. In some implementations, the additive manufacturing technique may comprise a 3D printing technology, such as, for example, MultiJet Fusion (MJF), Stereolithography (SLA), Selective Laser Melting or Sintering (SLM/SLS), Fused Deposition Modeling (FDM), etc. In other examples, a subtractive manufacturing method may be used to produce lasting 100, such as, for example, milling. Lasting 100 may comprise any suitable material or combination of materials to provide the desired characteristics and performance. For example, in some implementations, lasting 100 may comprise nylon, a polymer, an elastomer, or some combination thereof.

Referring still to FIG. 2, once lasting 100 is designed and manufactured as described above, lasting 100 is disposed about lower portion 54 of last 50 and attached to upper member 12. Lasting 100 and upper member 12 may be attached to one another through any suitable attachment method(s). For example, in some implementations, lasting 100 is sewn (e.g., with thread) to upper member 12. In other implementations, lasting 100 is adhered to upper member 12 using any suitable adhesive or glue. In still other implementations, lasting 100 is welded to upper member 12 by applying a welding material (e.g., polyurethane, polyisobutylene, butyl rubber, etc.) at an elevated temperature between the upper member 12 and lasting 100.

Referring briefly to FIGS. 3A, and 3B, in some examples, lasting 100 includes a plurality of attachment projections 102 that allow for engagement with corresponding apertures 14 or slits within upper member 12. In particular, in the implementation of FIG. 3B (wherein only one example attachment projection 102 and aperture 14 are shown), attachment projection 102 extends outward from a side or lateral surface 100*a* of lasting 100 and includes an enlarged head end 104. Upper member 12 includes a plurality of attachment apertures 14 (which may be holes or slits extending through the material making up the upper member 12), that receive one of the attachment projections 102 therethrough in order to secure upper member 12 to lasting 100. Further, in this example, the size of the apertures 14 in upper member 12 is such that they must be stretched or pulled with some predetermined about of force in order to advance over enlarged heads 104 of projections 102. As a result, undesired withdrawal of projections 102 from apertures 14 may be prevented (or restricted). In other examples, the attachment projections 102 may extend from a lower or bottom surface 100*b* of lasting 100 rather than lateral surface 100*a*, or may extend from both surfaces 100*a*, 100*b*. In addition, the engagement of attachment projections 102 and apertures 14 on lasting 100 and upper member 12, respectively, may be in addition to or in lieu of the other attachment methods (e.g., adhesive, welding, sewing, etc.) previously described.

Referring now to FIG. 4, once the lasting 100 and upper member 12 are secured to one another and disposed about the last 50 as previously described, the entire assembly of the last 50, upper member 12, and lasting 100 are inserted within a cavity 82 of a mold 80. Thereafter, a moldable material is injected into cavity 82 via a port 84 such that the moldable material fills the remaining portion or volume of cavity 82 and attaches to the lasting 100 and upper member 12 to form the midsole 20 of shoe 10 (see FIG. 1). Moldable material may comprise any suitable moldable material for forming a shoe midsole. In this example, the moldable material injected within cavity 82 may comprise polyurethane (e.g., a 2-part polyurethane). In this example, the moldable material forming midsole 20 attaches to both the upper member 12 and the lasting 100; however, in other examples, the moldable material forming the midsole 20 only attaches to lasting 100.

Referring now to FIG. 5, after midsole 20 is molded directly onto lasting 100 and upper member 12, outsole 40 is also molded onto midsole 20. For example, the assembly of the last 50, the upper member 12, lasting 100, and midsole 20 may be disposed within a cavity 92 of another mold 90. Thereafter, another moldable material is injected into cavity 92 via a port 94 such that the moldable material fills the remaining portion or volume of cavity 92 and attaches to midsole 20 to form outsole 40. The moldable material injected within the cavity 92 to form outsole 40 may comprise any suitable material for forming an outsole of a shoe, such as, for example rubber.

In other examples, outsole 40 is molded, or otherwise formed, separately from the other components of shoe 10 and is then attached to midsole 20 (e.g., via adhesive, welding, sewing, etc.). In still other examples, both midsole 20 and outsole 40 are molded or formed within the same cavity (e.g., within cavity 82 of mold 80 in FIG. 4 or within cavity 92 of mold 90 in FIG. 5), such as, for example, by injecting multiple types of material into the cavity simultaneously or at different times. In still other examples, midsole 20 and outsole 40 may be formed as a single integral component that is constructed from the same material(s) and is molded to upper member 12 and lasting 100 as previously described.

Referring again to FIGS. 1-5, upon forming the sole 25 (including midsole 20 and outsole 40) onto upper member 12 and lasting 100 as previously described, the last 50 is removed from the upper member 12 and lasting 100 via the upper opening 13, thereby resulting in the shoe 10 of FIG. 1. Thereafter, additional manufacturing steps may be taken to further finalize the shoe 10 for use (e.g., installing laces, adding additional covering textiles for decoration and style, inserting additional padded inserts within the upper member 12, etc.).

Referring now to FIGS. 6 and 7, in some examples, lasting 100 (see FIG. 1) may be replaced with a two-part lasting 200. Specifically, two-part lasting 200 may comprise a first or upper portion 210 and a second or lower portion 220.

Upper portion 210 may comprise that same material (or one of the same materials) that make up upper member 12. As a result, upper portion 210 may comprise textiles, fabrics, or other suitable materials as previously described above. In other examples, upper portion 210 may comprise a non-individualized piece or component (i.e., a component that has not been formed based on data relating to a specific user's foot) that comprises the same materials that make up lower portion 220 (e.g., polymers, elastomers, nylon, etc.). Upon attaching upper portion 210 to upper member 12, upper portion 210 of lasting 200 extends over and covers the lower portion 54 of last 50 in the same manner as described above for lasting 100.

Lower portion 220 may be substantially similar to lasting 100, in that, lower portion 220 is manufactured based on data relating to an individual's foot (e.g., 3D scans, pressure readings, etc.) in the same manner as described above for lasting 100. Thus, in this example, lower portion 220 provides the same performance characteristics within the final shoe (e.g., shoe 10) that were previously described as being provided by lasting 100.

Referring still to FIGS. 6 and 7, during operations, upper portion 210 of lasting 200 is coupled or attached to upper member 12 in substantially the same manner described above for lasting 100 (e.g., sewing, adhesive, welding, attachment projections 102 and apertures 14 in FIG. 3, etc.). In addition, the lower portion 220 is attached to the upper portion 210. In particular, the lower portion 220 may be attached to the upper portion 210 in substantially the same manner that the upper portion 210 is attached to the upper member 12. Further, lower portion 220 may be attached to upper portion 210 before or after upper portion 210 is attached to upper member 12. Still further, upper portion 210, lower portion 220, and upper member 12 may all be coupled to one another simultaneously. Following the attachment of lasting 200 to upper member 12 about last 50, sole 25 (e.g., midsole 20, outsole 40) may be attached to upper member 12 and lasting 200 in substantially the same manner as described above for upper member 12 and lasting 100 (see FIGS. 4 and 5).

By providing a non-individualized upper portion 210, the attachment or coupling operations between lasting 200 and upper member 12 can be improved. For example, without being limited to this or any other theory, the attachment of the non-individualized upper portion 210 to upper member 12 may be standardized (and thus more easily repeatable) since the design of upper portion 210 may not change from shoe to shoe (e.g., shoe 10), whereas the design of lower portion 220 may change from shoe to shoe based on the specific scan and pressure data relating to a user's foot. Additionally, the lasting 200 (via lower portion 220) provides the same customized performance and characteristics as described above for lasting 100.

Figure 8:
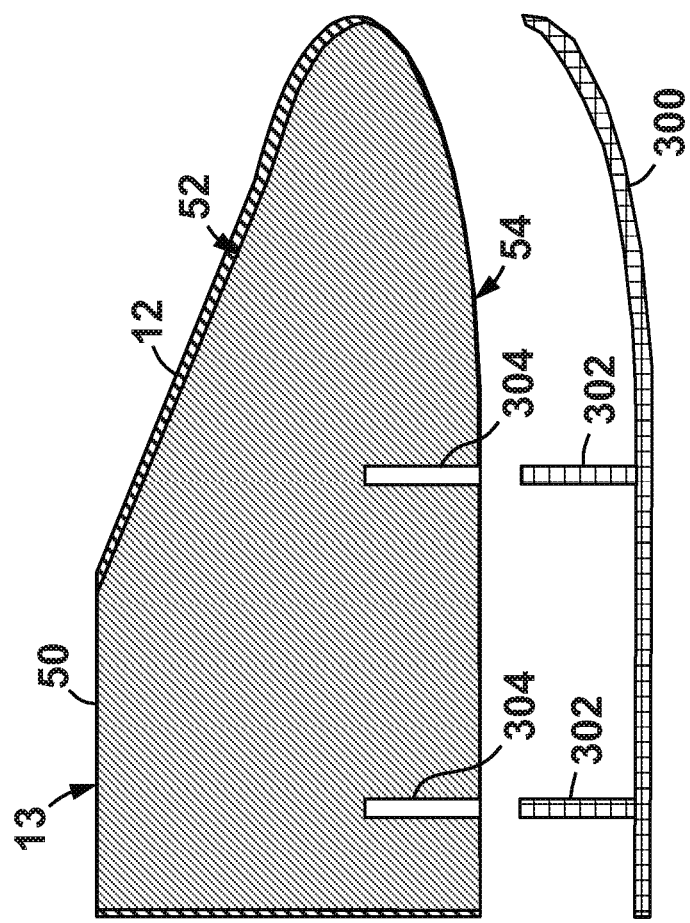
FIG. 8 is a schematic cross-sectional view of an upper member and lasting disposed about a last for another shoe made according to some examples.

Referring now to FIG. 8, in some examples, the last 50 and lasting (e.g., lasting 100, 200) may further include corresponding alignment members that engage to ensure that the lasting is properly and accurately positioned relative to last 50 before and after molding and attachment of soles 25 (i.e., midsole 20 and outsole 40). For example, FIG. 8 shows a plurality of male mounting projections 302 extending from a lasting 300. Apart from projections 302, lasting 300 is substantially the same as lasting 100 previously described (and thus a detailed description of the other components of lasting 300 is omitted herein in the interest of brevity). In addition, in this example, last 50 includes a pair of female mating recesses 304 that extend inward thereto from lower portion 54.

During manufacturing operations, the upper member 12 is disposed about upper portion 52 of last 50 in the same manner as previously described. Thereafter, the lasting 300 is disposed over (or covers) lower portion 54 and is attached to upper member 12 in the same manner described above for lasting 100 and upper member 12, except that as lasting 300 is maneuvered or positioned relative to last 50 and upper member 12, the mounting projections 302 on lasting 300 are inserted within the mating recesses 304 to ensure that lasting 300 is properly positioned relative to last 50.

Following the attachment of lasting 300 to upper member 12 about last 50, the sole 25 (including midsole 20 and outsole 40—see FIG. 1) may be formed on the upper member 12 and lasting 300 in substantially the same manner as described above for upper member 12 and lasting 100 (see FIGS. 4 and 5). However, during the molding of midsole 20 and outsole 40, pressures and forces within the mold cavity (e.g., cavity 82, 92, see FIGS. 4 and 5) may potentially induce relative movement between the last 50 and lasting 300. For example, the moldable material of midsole 20 and outsole 40 (see FIG. 1) may expand during the molding process and thereby exert a pressure on lasting 300 and/or upper member 12. However, the engagement between mounting projections 302 and mating recesses 304 helps to maintain the relative position of lasting 300 and last 50 in spite of these pressures and forces so that a higher relative positioning precision of upper member 12 and lasting 300 may be achieved during operations.

Following the molding operations for midsole 20 and outsole 40 (see FIG. 1), last 50 is removed from upper member 12 via upper opening 13 as previously described above. During this process, the mounting projections 302 are to break away from lasting 300 and remain within mating recesses 304 within last 50 so that the remaining portions of lasting 300 remain as a final component of the shoe (e.g., shoe 10). To further facilitate the removal of mounting projections 302 from lasting 300, mounting projections 302 may include a smaller diameter portion at or near the junction with the other portions of lasting 300, and/or may be manufactured from a relatively brittle material. However, other methods of facilitating the breaking of mounting projections 302 from lasting 300 are also contemplated herein.

It should be appreciated that lasting 200 of FIGS. 6 and 7 may also include similar mounting projections 302 for interaction with corresponding mating recesses 304 in last 50. For example, referring briefly again to FIGS. 6-8, one or both of upper portion 210 and lower portion 220 may include mounting projections 302 as previously described above for lasting 300. If lower portion 220 includes mounting projections 302 (regardless of whether upper portion 210 also includes similar mounting projections 302), upper portion 210 may also include corresponding mating recesses that align with recesses 304 in the last 50 such that mounting projections 302 extending from lower portion 220 extend through these recesses in upper portion 210 and into the mating recesses 304 of last 50 to provide the desired alignment between upper portion 210, lower portion 220, and last 50.

Figure 9:
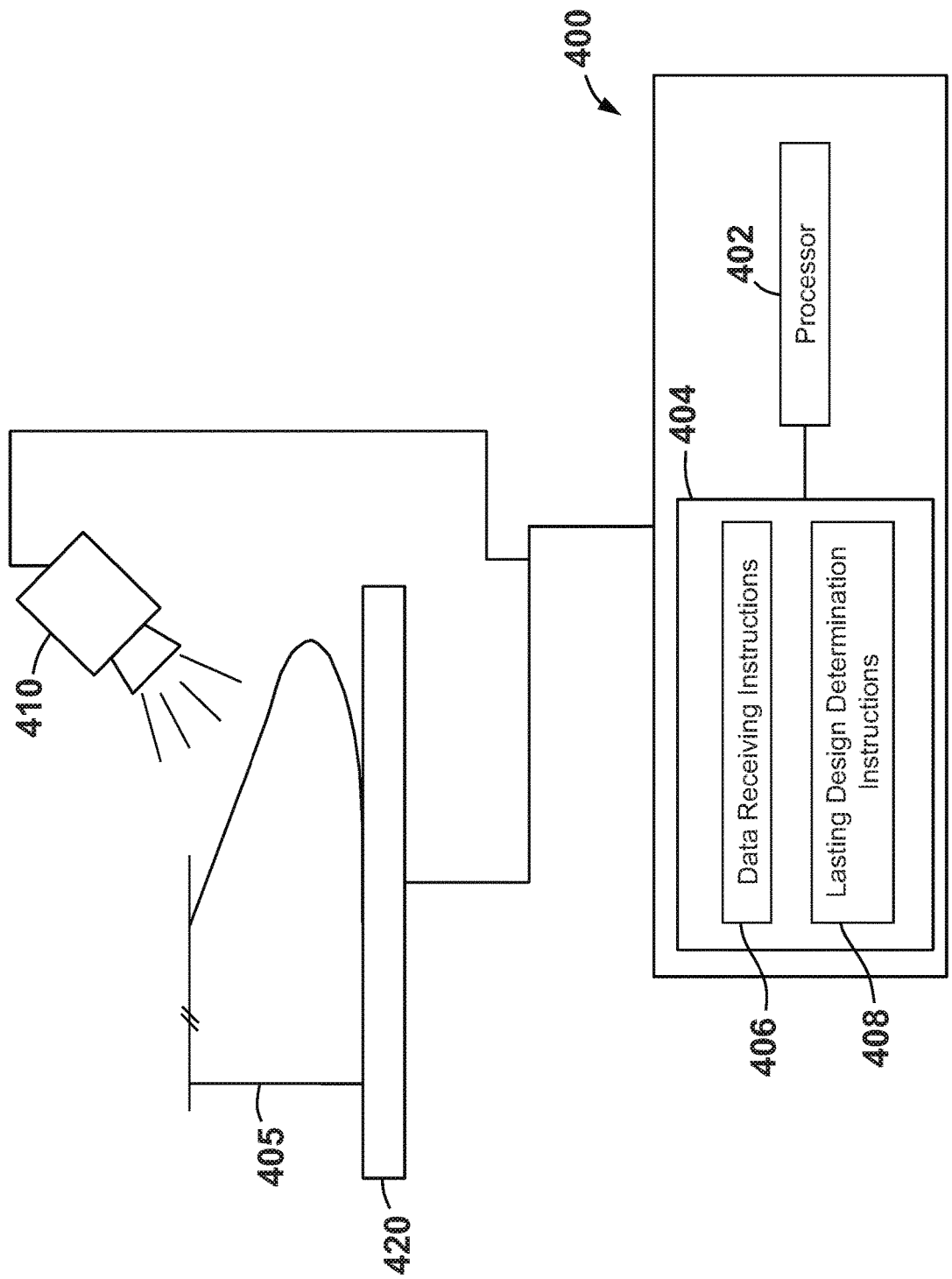
FIG. 9 is a schematic view of a computer system for facilitating the manufacturing of a shoe according to some examples.

Referring now to FIG. 9, a computing device 400 that is to determine the design of a lasting for a shoe (e.g., lasting 100, lower portion 220, lasting 300, etc.) is shown. Computing device 400 includes a processor 402 and a computer-readable storage medium 404.

Processor 402 may include a central processing unit (CPU), a semiconductor-based microprocessor, and/or other hardware devices suitable to control operations of computing device 400. Computer-readable storage medium 404 may be any electronic, magnetic, optical, or other physical storage device that contains or stores executable instructions. Thus, computer-readable storage medium 404 may be, for example, Random Access Memory (RAM), an Electrically Erasable Programmable Read-Only Memory (EEPROM), a storage device, an optical disc, etc. In some examples, computer-readable storage medium 404 may be a non-transitory storage medium, where the term "non-transitory" does not encompass transitory propagating signals. As described in detail below, computer-readable storage medium 404 may be encoded with a series of processor executable instructions 406 and 408.

Specifically, data receiving instructions 406 may receive 3D scan data, such as 3D scan data of an individual's foot 405 obtained with a 3D scanner 410. In addition, data receiving instructions 406 may receive pressure readings, such as dynamic and/or static pressure readings of related individual's foot 405 with a pressure pad 420. Lasting design determination instructions 408 may determine a shape, structure (e.g., lattice structure), thickness, density, materials, etc., of a lasting for a shoe (e.g., lasting 100, lower portion 220, lasting 300, etc.) based on the 3D scan data and/or the pressure data received using data receiving instructions 406. In some examples, the design may include instructions for forming engagement and alignment features (e.g., mounting projections 302) for engaging with corresponding alignment features (e.g., mating recesses 304) on a last (e.g., last 50) during the manufacturing of a shoe (e.g., shoe 10). In addition, in some examples, the design determination instructions 408 may be in a form to be utilized by a 3D printer (or other additive manufacturing device) to produce a lasting according to the design that is attachable to an upper member of a shoe in the manner previously described above. In some of these examples, the design determination instructions 408 may include specific instructions for forming a lattice structure within the lasting (e.g., via an additive manufacturing process such as MJF) to affect the desired performance characteristics of the lasting upon its inclusion and use within a shoe.

Figure 10:
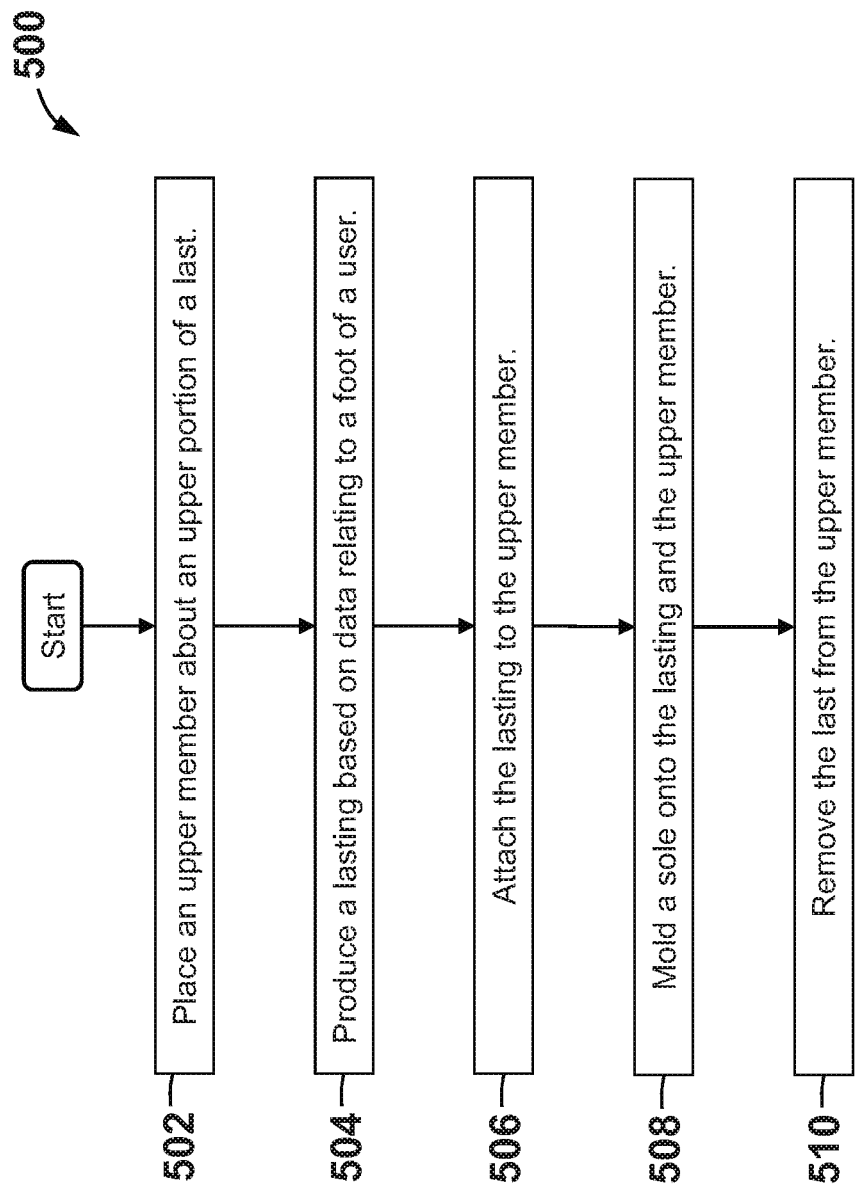
FIG. 10 is a flow chart of a method of manufacturing a shoe according to some examples.

Referring now to FIG. 10, an example method 500 of manufacturing a shoe is shown. In describing the features of method 500, reference is made to the examples of FIGS. 1-9; however, it should be appreciated that other examples may be used to perform method 500. Thus, the reference to the examples of FIGS. 1-9 should not be interpreted as limiting the application of method 500 in other implementations.

Initially, method 500 includes placing an upper member (e.g., upper member 12) about an upper portion (e.g., upper portion 52) of a last (e.g., last 50) at 502. Next, method 500 includes producing a lasting based on data relating to a foot of a user at 504. For example, as previously described above in reference to FIGS. 2-8, a lasting (e.g., lasting 100, 300) or at least a portion thereof (e.g., lower portion 220 of lasting 200) is produced based on data relating to a foot (e.g., foot 405 in FIG. 9) of a user, such as, for example 3D scan data and/or pressure data (e.g., see scanner 410 and pressure pad 420 in FIG. 9). The lasting produced at 504 may be produced by an additive manufacturing device (e.g., a 3D printer) based on computer readable instructions (e.g., instructions 406, 408) that are derived from the data relating to the foot as previously described above in the example of FIG. 9. Next, method 500 includes attaching the lasting to the upper member at 506, such as, for example, by sewing, welding, adhesive(s), engagement of corresponding attachment projections and apertures (e.g., projections 102 and apertures 14 shown in FIGS. 3A and 3B) or combinations thereof as described above for the examples of FIGS. 2-8. In addition, attaching the lasting to the upper member at 506 may also include covering a lower portion (e.g., lower portion 54) of the last 50 with the lasting (e.g., see FIGS. 2, 7, and 8). At 508, method 500 includes molding a sole (e.g., sole 25) on the lasting and the upper member. For example, in some implementations, both a midsole (e.g., midsole 20) and an outsole (e.g., outsole 40) are molded onto the lasting and upper member at 508, such as in the manner previously described above with reference to FIGS. 4 and 5. In other implementations, only a midsole (e.g., midsole 20) is molded onto lasting and upper member 12. Thus, as used herein, the phrases "mold a sole" and "molding a sole" (e.g., such as at 508 in method 500) may refer to molding a midsole, an outsole, or both (either separately or simultaneously) onto the upper member and lasting. Finally, method 500 includes removing the last from the upper member at 510. For example, as previously described above in the examples of FIGS. 2-8, the last 50 may be removed from upper member 12 via opening 13.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A method of manufacturing a shoe, the method comprising:
   placing an upper member about an upper portion of a last, wherein the last is a form for the shoe;
   providing a non-individualized upper portion of a lasting member that has not been formed based on data relating to a foot of any specific user;
   producing an individualized lower portion of the lasting member based on data relating to a foot of a specific user;
   attaching the non-individualized upper portion to the individualized lower portion to form the lasting member;
   attaching the lasting member to the upper member, wherein the lasting member extends over a lower portion of the last;
   molding a sole onto the lasting member and the upper member; and
   removing the last from the upper member.

2. The method of claim 1, wherein producing the individualized lower portion of the lasting member comprises producing the individualized lower portion of the lasting member based on a three dimensional (3D) scan of the foot.

3. The method of claim 2, wherein producing the individualized lower portion of the lasting member comprises producing the individualized lower portion of the lasting member based on one of static and dynamic pressure associated with the foot.

4. The method of claim 1, wherein producing the individualized lower portion of the lasting member comprises producing the lasting member with a three dimensional (3D) printing process.

5. The method of claim 1, wherein molding a sole onto the lasting member and the upper member comprises molding a midsole onto to the lasting member and the upper member, and coupling an outsole to the midsole.

6. The method of claim 1, where the non-individualized upper portion of the lasting member is attached to the individualized lower portion of the lasting member before, after, or at a same time the lasting member is attached to the attached to the upper member.

7. A method of manufacturing a shoe, the method comprising:
    placing an upper member about an upper portion of a last, wherein the last is a form for the shoe;
    producing a lasting member based on data relating to a foot of a specific user, the lasting member having a plurality of mounting projections;
    attaching the lasting member to the upper member, wherein the lasting member covers a lower portion of the last;
    while attaching the lasting member to the upper member, inserting the mounting projections of the lasting member into corresponding mating recesses of the last;
    molding a sole onto the lasting member and the upper member;
    removing the last from the upper member; and
    while removing the last from the upper member, fracturing the mounting projections from the lasting member such that the mounting projections are removed with removal of the last from the upper member while the lasting member without the mounting projections remains.

8. The method of claim 7, wherein producing the lasting member comprises producing the lasting member with a three dimensional (3D) printing process.

* * * * *